United States Patent [19]

Parker et al.

[11] Patent Number: 4,779,516
[45] Date of Patent: Oct. 25, 1988

[54] CAM AND LOCK VACUUM BOOSTER MOUNT WITH LOCKING ARM

[75] Inventors: Donald L. Parker, Middletown; James W. Miller, Xenia, both of Ohio

[73] Assignee: General Motors Corporation, Detroit, Mich.

[21] Appl. No.: 776,698

[22] Filed: Sep. 16, 1985

[51] Int. Cl.⁴ .................. F01B 29/00; F01B 11/02; B25G 3/16; F16B 7/20
[52] U.S. Cl. .................................. 92/128; 92/161; 92/169; 248/222.1; 24/590; 403/349; 403/201
[58] Field of Search ............ 92/128, 161, 146, 98 D, 92/169.2, 187, 169.1; 248/222.3, 222.1; 403/326, 348, 349, 194, 199, 201; 24/590–593, 671, 673, 674

[56] References Cited

U.S. PATENT DOCUMENTS

| | | | |
|---|---|---|---|
| 757,712 | 4/1904 | Arnold | 403/348 X |
| 2,496,928 | 2/1950 | Bing et al. | 403/348 X |
| 2,886,355 | 5/1959 | Wurzel | 403/326 |
| 2,977,935 | 4/1961 | Randol | 91/369 B |
| 3,013,537 | 12/1961 | Schultz | 60/547.1 X |
| 3,175,235 | 3/1965 | Randol | 91/369 B |
| 4,056,043 | 11/1977 | Sriramamurty et al. | 92/98 D |
| 4,223,861 | 9/1980 | Guggemos et al. | 248/222.3 |
| 4,400,856 | 8/1983 | Tseng | 403/348 X |
| 4,405,251 | 9/1983 | Kolchinsky et al. | 403/326 X |
| 4,455,829 | 6/1984 | Seip | 92/128 X |
| 4,487,022 | 12/1984 | Kytta | 92/169.2 X |
| 4,538,967 | 9/1985 | Furukawa | 403/349 X |
| 4,569,276 | 2/1986 | Kytta | 92/98 D |
| 4,601,603 | 7/1986 | Nakayama | 403/326 X |

FOREIGN PATENT DOCUMENTS 2085105A 4/1982 United Kingdom .......... 92/169.2 X

Primary Examiner—Abraham Hershkovitz
Assistant Examiner—George Kapsalas
Attorney, Agent, or Firm—D. D. McGraw

[57] ABSTRACT

A booster is mounted on a supporting panel by a cam and lock arrangement. The mount can be accomplished from one panel side, and the booster input push rod is readily connected to a pedal arm.

3 Claims, 1 Drawing Sheet

CAM AND LOCK VACUUM BOOSTER MOUNT WITH LOCKING ARM

BACKGROUND OF THE INVENTION

The invention relates to a mounting arrangement for mounting a power head such as that of a brake booster to a fixed panel, the mounting being arranged on one side of the panel for simplified assembly. It more particularly relates to a cam locking arrangement for mounting a brake booster to the dash of a vehicle. The booster may be of a conventional type, which is normally mounted to the vehicle dash panel with the booster in the engine compartment of the vehicle and the booster push rod extending rearwardly into the passenger compartment and attached to a brake pedal arm for actuation by the vehicle operator. It has been common practice for many years to secure a brake booster housing to the firewall of a vehicle by means of studs extending through holes in the firewall. In some instances a mounting bracket may be secured to the firewall and the booster is in turn secured to the mounting bracket. Examples of such constructions are replete in the art. For example, U.S. Pat. No. 3,013,537, issued Dec. 19, 1961, shows a booster 13 with bolts 43 extending through the firewall so as to mount the booster on the firewall. A bracket mounting arrangement using studs is illustrated in U.S. Pat. No. 2,949,892, issued Aug. 23, 1960. It has also been known to secure a bracket to the booster and have the bracket extend into the passenger compartment with the mounting bracket being bolted to the firewall. Examples of this are found in U.S. Pat. Nos. 3,698,260, issued Oct. 17, 1972; and 3,714,780, issued Feb. 6, 1973.

It is proposed to practice the invention herein disclosed and claimed by providing a housing plate on the power head which is meshed with and turned to cam lock into another plate which is secured to the vehicle dash. All of the brake booster push rod attachments can be attached or installed from the engine compartment side of the dash. Once the booster power head has been interlocked in camming relation, a fastener or fasteners may be secured to keep the booster power head from rotating in the reverse direction to become unlocked. All of the motions of installing the power head are circular about the axis of the power head and push rod, the camming action producing a slight axial movement as the power head is cam locked in place. The booster push rod may have a ball and socket snap action arrangement so that the push rod is connected to the brake pedal arm after the booster assembly is attached to the dash by merely pressing the brake pedal arm downwardly over the ball end of the push rod.

DETAILED DESCRIPTION OF THE PREFERRED EMBODIMENT

Figure 1:
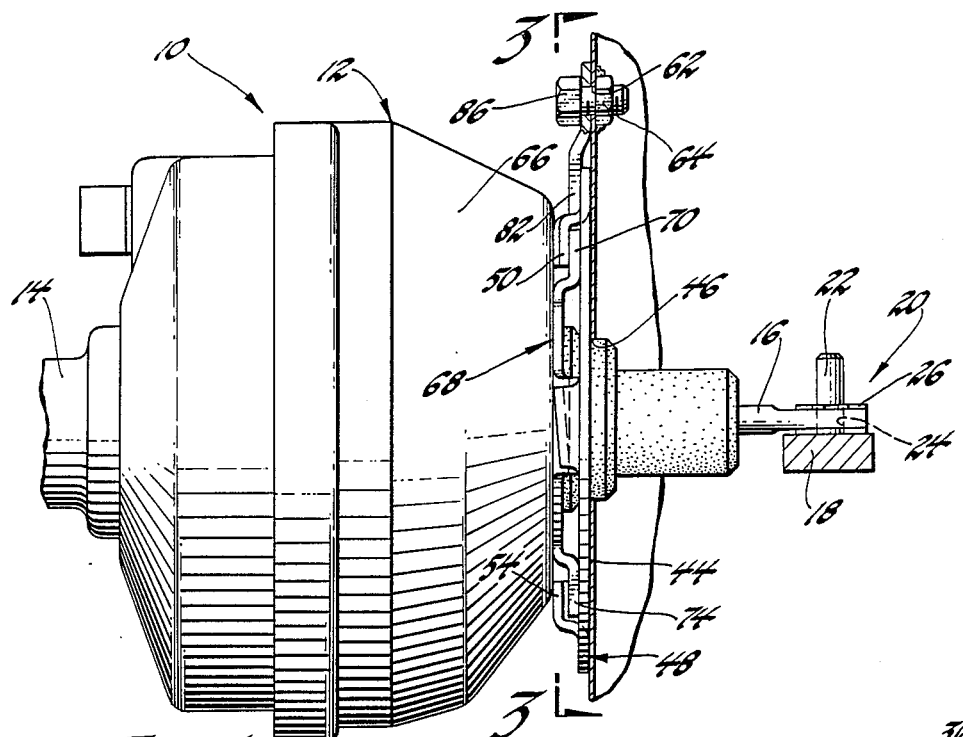
FIG. 1 is an elevation view with parts broken away and in section and illustrating a brake booster power head secured to a vehicle dash or firewall panel by an arrangement embodying the invention.

The power head 10 shown in the drawing is illustrated as being a brake booster assembly including a booster housing 12 and a master cylinder assembly 14 actuated by the booster, as is well known in the art. The booster assembly 10 includes a push rod 16 extending rearwardly and connected to the brake pedal arm 18 of the vehicle for actuation. The connection 20 to the brake pedal arm illustrated in FIG. 1 includes a pin 22 extending a short distance laterally from the arm and received through an eye 24 formed on the outer end of push rod 16. A clip 26 is fitted over the pin 22 and grips the pin so as to hold the push rod eye 24 to the brake pedal arm.

Figure 2:
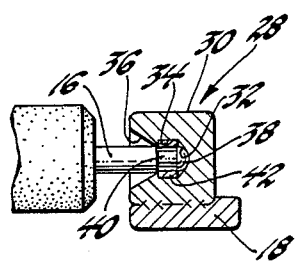
FIG. 2 is a fragmentary cross-section view of an attachment arrangement between the push rod and the brake pedal arm permitting snap action attachment.

FIG. 2 shows a modified connection 28 between the push rod 16 and the brake pedal arm 18. In this connection, a socket member 30 is secured to the side of the brake pedal arm 18 and is formed with a socket 32 opening toward the push rod 16. Socket 32 has a groove 34 formed therein and then flares outwardly as shown at 36 to provide a guide surface for the rear end of push rod 16. Push rod 16 has its rear end formed with a ball-like head 38. A groove 40 adjacent head 38 receives a snap ring 42 therein. The groove 40 and the snap ring 42 are so arranged that the push rod head 38 may be forced into socket 32, causing the snap ring to deflect radially inward so that passes axially into the groove 34 and then expands within that groove to hold the push rod head in place in the socket 32. It can be seen that this assembly may be accomplished by merely depressing the brake pedal arm 18 after the booster assembly 10 is secured in place as described below.

The vehicle in which the assembly 10 is installed has a fixed panel 44 which is sometimes identified as a firewall or dash. The portion of the panel which is directly related to the mounting arrangement for the booster is preferably a planar panel section as illustrated in FIG. 1. It has an opening 46 formed therein through which the rearward portion of the booster assembly 10, particularly including push rod 16, axially extends. An annular cam plate 48 is secured to the side of the panel 44 facing the engine compartment of the vehicle. It is secured about the panel opening 46. The cam plate has a series of circumferentially spaced cam tabs 50, 52, 54 and 56 extending radially inwardly therefrom and in axially spaced relation to the planar panel section of fixed panel 44. While four such cam tabs are shown, it is recognized that three or more cam tabs will function quite well. Each of the cam tabs has an arcuately oriented trailing edge 58 and an arcuately oriented leading edge 60. The leading edge 60 of each cam tab is spaced axially further away from the planar panel section of panel 44 than is the trailing edge 58 of each of the cam tabs. Therefore each of the cam tabs is positioned in a plane which is at an angle to the plane of the planar panel section of panel 44. Panel 44 is also provided with another opening 62 which is spaced radially outwardly of the annular cam plate 48. A suitable internally threaded member such as nut 64 is provided as part of opening 62 and is adapted to receive a threaded mounting screw therethrough as will be further described.

The power head housing 12 includes a housing section 66 which extends axially and radially, with the push rod 16 extending outwardly therefrom. An annular cam bracket 68 is secured to the power head housing section 66 about the push rod 16. Cam bracket 68 has circumferentially spaced bracket tabs 70, 72, 74 and 76 which extend radially outwardly and are in axially spaced relation to the power head housing section 66. Each of the bracket tabs has an arcuately oriented trailing edge 78 and an arcuately oriented leading edge 80. It is to be understood that three or more bracket tabs may be formed from the annular cam bracket 68, so long as they are circumferentially spaced in cooperative relation with the cam tabs of the annular cam plate 48. The bracket tabs 70, 72, 74 and 76 are circumferentially spaced in cam-engageable relation with the cam tabs 50, 52, 54 and 56. When so engaged they cooperate with the cam tabs to secure the power head 10 to the panel 44. The leading edges 60 of the cam tabs 50, 52, 54 and 56 engage the bracket tabs 70, 72, 74 and 76 as the power head is placed in position and rotated about the axis of the power head and push rod. This engagement is in cammed relation so that the power head is mounted firmly to the panel 44. The power head may be arcuately rotatable in the opposite direction to disengage the bracket tabs from the cam tabs to remove the power head from the panel. In some instances, it is desirable to have the bracket tabs 70, 72, 74 and 76 so arranged that their leading edges 80 are spaced axially from the panel 44 for a distance which is different from that of the trailing edges of those tabs so that the bracket tabs are each positioned in a plane which is at an angle to the plane of the panel 44. Therefore in some instances bracket tabs 70, 72, 74 and 76 are the angled cam tabs and in other instances the cam tabs 50, 52, 54 and 56 are the angled tabs. In other instances it may be desirable to provide both sets of tabs at angles so as to increase camming action.

The annular cam bracket 68 has an arm 82 extending outwardly therefrom and provided with an opening 84 in its outer end. A threaded mounting screw 86 is positioned so as to extend through opening 84 and the opening 62 of panel 44, and then is threadedly secured to the nut 64. Screw 86 therefore holds the bracket 68 and the power head in secure relation against rotational movement of the power head relative to the panel while the booster is installed for normal use.

Figure 3:
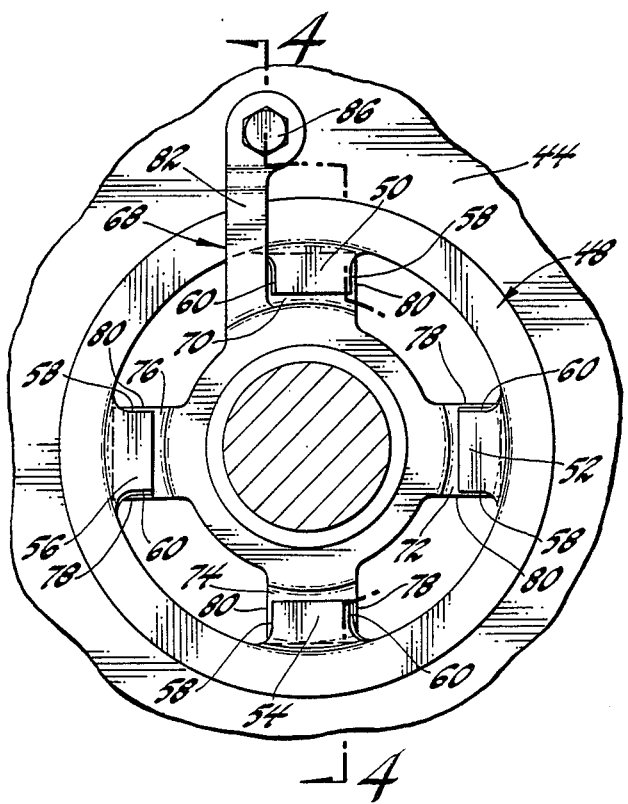
FIG. 3 is a cross-section view taken in the direction of arrows 3—3 of FIG. 1 and showing the cam lock arrangement in the locked position with a bracket arm which prevents the power head from becoming unlocked.
Figure 4:
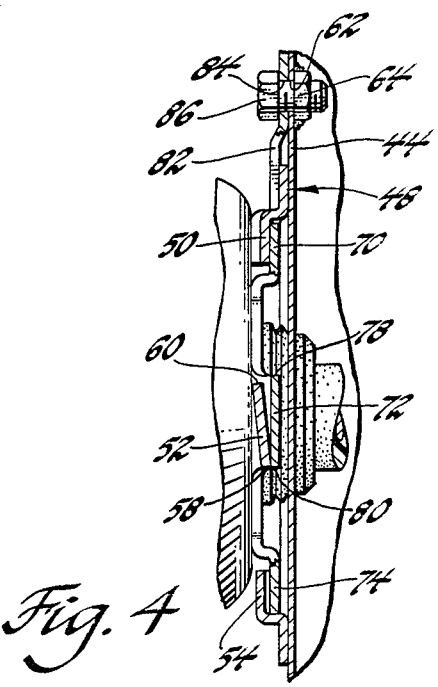
FIG. 4 is a cross-section view taken in the direction of arrows 4—4 of FIG. 3, with parts broken away, and further illustrating the cam lock arrangement embodying the invention.

In order to mount the booster assembly 10 to the panel 44, it is merely necessary to axially align the push rod 16 with the panel opening 46 and to align the bracket tabs 70, 72, 74 and 76 with spaces between the cam tabs 50, 52, 54 and 56. As seen in FIG. 3, this should place the bracket arm 82 at an upwardly and leftwardly extending angle. The entire booster assembly is then arcuately rotated clockwise as seen in FIG. 3 so that the tabs 50, 52, 54 and 56 and the tabs 70, 72, 74 and 76 operate in camming relation to tightly secure the power head 10 to the panel 44. In doing so the two sets of tabs are positioned as best shown in FIGS. 3 and 4. The opening 84 of bracket arm 82 is in alignment with the opening 62 of panel 44 and screw 86 is then threaded into nut 64 and tightened to hold the bracket arm in position, thereby preventing any further rotational movement of bracket 68 and power head 10 in either direction.

If the attachment arrangement for attaching the push rod 16 to the brake pedal arm 18 includes the pin arrangement of FIG. 1, the push rod is pivoted laterally so that the push rod eye 24 fits over pin 22, and the clip 26 is installed. When the attachment arrangement is that shown in FIG. 2, the brake pedal arm socket 30 is merely positioned over the head of the push rod and the brake pedal arm is depressed, snapping the push rod head 38 and the snap ring 42 into the socket 32 and retaining the push rod to the brake pedal arm

We claim:

1. An arrangement mounting a vacuum power head to a fixed panel on one side of and from only the one side of the panel and securing the vacuum power head against rotation, said arrangement comprising:
    a panel having a planar panel section with a first opening therethrough and one panel side and an opposite panel side;
    an annular cam plate secured to said one side of said planar panel section about said first opening and having a set of at least three circumferentially spaced cam plate tabs extending radially inwardly and in axially spaced relation to said planar panel section, each of said cam plate tabs having an arcuately oriented leading edge and trailing edge;
    a vacuum power head having an axially and radially extending housing section and a push rod extending outwardly therefrom, said push rod being adapted to be axially moved to control said power head;
    and an annular cam bracket secured to said power head housing section about said push rod, said cam bracket having a set of at least three circumferentially spaced cam bracket tabs extending radially outwardly and in axially spaced relation to said power head housing section, each of said cam bracket tabs having an arcuately oriented leading edge and trailing edge;
    said leading edges of at least one set of said sets of tabs being spaced axially further away from said planar panel section than said trailing edges thereof so that each tab of said at least one set of tabs is positioned in a plane which is at an angle to the plane of said planar panel section;
    said cam bracket tabs being circumferentially spaced in cam-engaging relation with said cam plate tabs and cooperating therewith by arcuate rotation of said power head about the axis thereof to secure said power head to said one side of said panel with said tab leading edges of said tabs of one of said tab sets engaging said tabs of the other of said tab sets in cammed relation adjacent said tab trailing edges of said other tab set, said power head being arcuately rotatable to disengage said cam bracket tabs from said cam plate tabs and then permit removal of said power head away from said panel;
    said annular cam bracket having an arm extending outwardly therefrom, said arm and said panel having means removably but lockingly securing said arm and therefore said annular cam bracket to said one side of said panel to hold said bracket and said power head in secure relation against rotational movement while said power head is mounted on said one side of said panel by said cam plate tabs and said cam bracket tabs as aforesaid.

2. An arrangement mounting a vacuum power head to a fixed panel on one side of and from only one side of the panel and securing the vacuum power head against rotation, said arrangement comprising:

a panel having a planar panel section with a first opening therethrough and one panel side and an opposite panel side;

an annular cam plate secured to said one side of said planar panel section about said first opening and having a set of at least three circumferentially spaced cam plate tabs extending radially inwardly and in axially spaced relation to said planar panel section, each of said cam plate tabs having an arcuately oriented leading edge and trailing edge with said leaing edge being spaced axially further away from said planar panel section than said trailing edge so that each of said cam plate tabs is positioned in a plane which is at an angle to the plane of said planar panel section;

a second opening in said panel having internally threaded means adapted to receive a threaded mounting screw therethrough from said one side of said panel;

a vacuum power head having an axially and radially extending housing section and a push rod extending outwardly therefrom, said push rod being adapted to be axially moved to control said power head when said power head is mounted on said panel one side with said push rod extending through said first opening;

and an annular cam bracket secured to said power head housing section about said push rod, said cam bracket having a set of at least three circumferentially spaced cam bracket tabs extending radially outwardly and in axially spaced relation to said power head housing section, each of said cam bracket tabs having an arcuately oriented leading edge and trailing edge, said cam bracket tabs being circumferentially spaced in cam-engaging relation with said cam plate tabs and cooperating therewith to secure said power head to said panel with said cam plate tab leading edges engaging said cam bracket tabs in cammed relation adjacent said cam bracket tab trailing edges, said power head being arcuately rotatable to disengage said cam bracket tabs from said cam plate tabs and then permit removal of said power head away from said panel;

said annular cam bracket having an arm extending outwardly therefrom provided with an opening in the outer end thereof and having mounting screw extending therethrough and threadedly secured to said internally threaded means from said one panel side to hold said bracket and said power head in secure relation against rotational movement while ssaid power head is mounted on said panel by said tabs as aforesaid.

3. An arrangement mounting a vacuum power head to a fixed panel on and from only one side of the panel, securing the vacuum power head against rotation, and connecting the vacuum power head push rod to a control arm located on the opposite side of the panel, said arrangement comprising:

a panel having a planar panel section with a first opening therethrough and one panel side and an opposite panel side;

an annular cam plate secured to said one side of said planar panel section about said first opening and having a set of at least three circumferentially spaced cam plate tabs extending radially inwardly and in axially spaced relation to said planar panel section, each of aid cam plate tabs having an arcuately oriented leading edge and trailing edge with said leading edge being spaced axially further away from said planar panel section than said trailing edge so that each of said cam plate tabs is positioned in a plane which is at an angle to the plane of said planar panel section;

a second opening in said panel having internally threaded means adapted to receive a threaded mounting screw therethrough from said one panel side;

a vacuum power head having an axially and radially extending housing section and a push rod extending outwardly therefrom, said push rod being adapted to be axially moved to control said power head;

a control arm mounted adjacent said opposite side of said panel from said cam plate and having means connecting said push rod thereto in axial force transmitting relation for controlling movements of said push rod and therefore controlling said power head;

an annular cam bracket secured to said power head housing section about said push rod, said cam bracket having a set of at least three circumferentially spaced cam bracket tabs extending radially outwrdly and in axially spaced relation to said power head housing section, each of said cam bracket tabs having an arcuately oriented leading edte and trailing edge, said cam bracket tabs being circumferentially spaced in cam-engaging relation with said cam plate tabs and cooperating therewith by arcuate rotation of said power head about its axis to secure said power head to said one side of said panel with said cam plate tab leading edges engaging said cam bracket tabs in cammed relation adjacent said cam bracket tab trailing edges, said power head being arcuately rotatable to disengage said cam bracket tabs from said cam plate tabs and then permit removal of said power head away from said panel;

said annular cam bracket having an arm extending outwardly therefrom provided with an opening in the outer end thereof and having a mounting screw extending therethrough and threadedly secured to said internally threaded means from said one panel side to hold said bracket and said power head in secure relation against rotational movement while said power head is mounted on said panel by said tabs as aforesaid;

said control arm having push rod-receiving means thereon into which said push rod is inserted and secured after securing said power head to said panel with said push rod extending through said first opening, said push rod-receiving means cooperating with said push rod to transmit axial forces to said push rod from said control arm after said insertion is made from said one side of said panel on which said power head is mounted.

* * * * *